United States Patent
Man et al.

(10) Patent No.: US 8,365,039 B2
(45) Date of Patent: *Jan. 29, 2013

(54) ADJUSTABLE READ REFERENCE FOR NON-VOLATILE MEMORY

(75) Inventors: Chun Fung Man, Vancouver (CA); Jonathan E. Schmidt, Vancouver (CA)

(73) Assignee: Intel Corporation, Santa Clara, CA (US)

( * ) Notice: Subject to any disclaimer, the term of this patent is extended or adjusted under 35 U.S.C. 154(b) by 952 days.

This patent is subject to a terminal disclaimer.

(21) Appl. No.: 12/283,832

(22) Filed: Sep. 16, 2008

(65) Prior Publication Data

US 2009/0292969 A1    Nov. 26, 2009

Related U.S. Application Data

(60) Provisional application No. 61/128,468, filed on May 21, 2008.

(51) Int. Cl.
 *G11C 29/00* (2006.01)
 *G11C 11/34* (2006.01)
 *G06F 11/00* (2006.01)

(52) U.S. Cl. ........ 714/763; 714/6.1; 714/6.24; 714/718; 714/723; 714/764; 714/765; 714/799; 365/185.03; 365/185.09; 365/185.2; 365/201

(58) Field of Classification Search .................. 714/6.1, 714/6.24, 718, 721, 723, 763, 764, 768, 799; 365/185.03, 185.09, 185.2, 201
See application file for complete search history.

(56) References Cited

U.S. PATENT DOCUMENTS

| | | | | |
|---|---|---|---|---|
| 4,691,319 A | * | 9/1987 | Bose et al. | 714/808 |
| 5,048,023 A | * | 9/1991 | Buehler et al. | 714/773 |
| 5,532,962 A | | 7/1996 | Auclair et al. | |
| 6,418,051 B2 | | 7/2002 | Manstretta et al. | |
| 7,280,415 B2 | * | 10/2007 | Hwang et al. | 365/189.09 |
| 7,437,641 B1 | * | 10/2008 | Gorshe | 714/732 |
| 7,568,135 B2 | * | 7/2009 | Cornwell et al. | 714/721 |
| 7,616,484 B2 | | 11/2009 | Auclair et al. | |
| 7,639,542 B2 | * | 12/2009 | Cornwell et al. | 365/185.2 |
| 7,773,022 B2 | * | 8/2010 | Cornwell et al. | 341/156 |
| 7,773,413 B2 | | 8/2010 | Shalvi | |
| 7,788,553 B2 | * | 8/2010 | Chow et al. | 714/718 |
| 7,839,685 B2 | | 11/2010 | Auclair et al. | |
| 7,852,690 B2 | * | 12/2010 | Cornwell et al. | 365/189.2 |
| 7,859,908 B2 | * | 12/2010 | Cornwell et al. | 365/185.22 |
| 7,881,108 B2 | * | 2/2011 | Cornwell et al. | 365/185.09 |
| 7,911,834 B2 | * | 3/2011 | Cornwell et al. | 365/185.03 |

(Continued)

OTHER PUBLICATIONS

Eli Lusky et al., "NROM Technology", Excerpt from IEEE book on NVM Technologies, Jun. 2007, pp. 1-40.

(Continued)

*Primary Examiner* — John J Tabone, Jr.
(74) *Attorney, Agent, or Firm* — Christopher K. Gagne

(57) ABSTRACT

In a non-volatile memory that reads a binary value from a storage cell by comparing the voltage level of a stored charge in that cell against a reference voltage, the accumulated errors in a range of memory locations may be analyzed to determined if there are more errors in one direction than the other (for example, more 0-to-1 errors than 1-to-0 errors). If so, the reference voltage may be adjusted up or down so that subsequent reads from that range may produce approximately the same number of errors in each direction. For multiple-bits-per-cell memories, where there are multiple reference voltages for each cell, each reference voltage may be adjusted separately by keeping track of the errors related to that particular threshold.

21 Claims, 4 Drawing Sheets

U.S. PATENT DOCUMENTS

| | | | |
|---|---|---|---|
| 7,974,132 B2 * | 7/2011 | Cornwell et al. | 365/185.2 |
| 8,000,134 B2 * | 8/2011 | Cornwell et al. | 365/185.03 |
| 8,276,028 B2 | 9/2012 | Man et al. | |
| 2008/0077842 A1 | 3/2008 | Gonzalez et al. | |
| 2008/0168320 A1 * | 7/2008 | Cassuto et al. | 714/746 |
| 2008/0320366 A1 | 12/2008 | Lin | |
| 2009/0132758 A1 * | 5/2009 | Jiang et al. | 711/103 |
| 2009/0132895 A1 * | 5/2009 | Jiang et al. | 714/781 |
| 2009/0144600 A1 | 6/2009 | Perlmutter et al. | |
| 2009/0210771 A1 * | 8/2009 | Yang et al. | 714/763 |
| 2009/0292970 A1 * | 11/2009 | Man et al. | 714/763 |
| 2009/0292971 A1 * | 11/2009 | Man et al. | 714/763 |
| 2009/0323418 A1 * | 12/2009 | Cornwell et al. | 365/185.09 |
| 2010/0070798 A1 * | 3/2010 | Cornwell et al. | 714/5 |
| 2011/0099438 A1 | 4/2011 | Gonzalez et al. | |
| 2011/0170348 A1 * | 7/2011 | Cornwell et al. | 365/185.03 |

OTHER PUBLICATIONS

Office Action received for U.S. Appl. No. 12/283,861, mailed on Nov. 4, 2011, 11 pages.

Notice of Allowance received for U.S. Appl. No. 12/283,861, mailed on Feb. 9, 2012, 5 pages.

Response to Office Action received for U.S. Appl. No. 12/283,861, filed on Jan. 17, 2012, 9 pages.

Office Action received for U.S. Appl. No. 12/288,617, mailed on Feb. 2, 2012, 13 pages.

Response to Office Action received for U.S. Appl. No. 12/288,617, filed on Apr. 6, 2012, 12 pages.

Response to Office Action received for U.S. Appl. No. 12/288,617, filed on Jan. 13, 2012, 10 pages.

Office Action received for U.S. Appl. No. 12/288,617, mailed on Nov. 8, 2011, 13 pages.

Office Action received for U.S. Appl. No. 12/288,617, mailed on Apr. 20, 2012, 14 pages.

Response to Office Action received for U.S. Appl. No. 12/288,617, filed on Jul. 13, 2012, 11 pages.

Office Action received for U.S. Appl. No. 12/288,617, mailed on Aug. 31, 2012, 20 pages.

Office Action received for U.S. Appl. No. 12/288,617, mailed on Apr. 20, 2012, 15 pages.

Notice of Allowance received for U.S. Appl. No. 12/283,861, mailed on Jun. 5, 2012, 16 pages.

* cited by examiner

| S0 | S1 | S2 | S3 | S4 | S5 | S6 | S7 |
|---|---|---|---|---|---|---|---|
| E↓ E↑ | E↓ | E↓ | E↓ | E↓ E↓ E↓ | E↓ | | E↑ E↑ |

E↓ = 8
E↑ = 3
DIFFERENCE = 5 ↓

FIG. 3

ADJUSTABLE READ REFERENCE FOR NON-VOLATILE MEMORY

CROSS-REFERENCE TO RELATED APPLICATIONS

This application is related to U.S. provisional application Ser. No. 61/128,468, filed May 21, 2008, and claims priority to that date for all applicable subject matter.

BACKGROUND

Some types of non-volatile memory, such as flash memory, record binary data by storing a certain amount of charge in a memory cell. When the data is read, the voltage level of the stored charge is compared to a reference voltage. The binary value of the bit read from that cell will depend on whether the voltage of the stored charge is higher or lower than the reference voltage. However, since the stored charge is an analog phenomenon, its actual value may not be exactly what was intended, and it may even leak away over time, so this type of non-volatile memory is subject to errors when reading the data stored in the memory. When such errors occur while reading sequential data from the memory, an error checking and correction (ECC) process may be used to detect and hopefully correct the errors. But some errors may even be uncorrectable with the ECC. Whether a particular error is correctable at the time or not, this degradation in the reliability of the memory is an ongoing problem. This type of problem may become even more widespread as flash memories move increasingly to smaller geometries and to multiple-bits-per-cell structures, which have less tolerance for variation in the stored charge.

BRIEF DESCRIPTION OF THE DRAWINGS

Some embodiments of the invention may be understood by referring to the following description and accompanying drawings that are used to illustrate embodiments of the invention.

FIG. 3 shows the errors obtained from reading a page of data, according to an embodiment of the invention.

DETAILED DESCRIPTION

Figure 1:
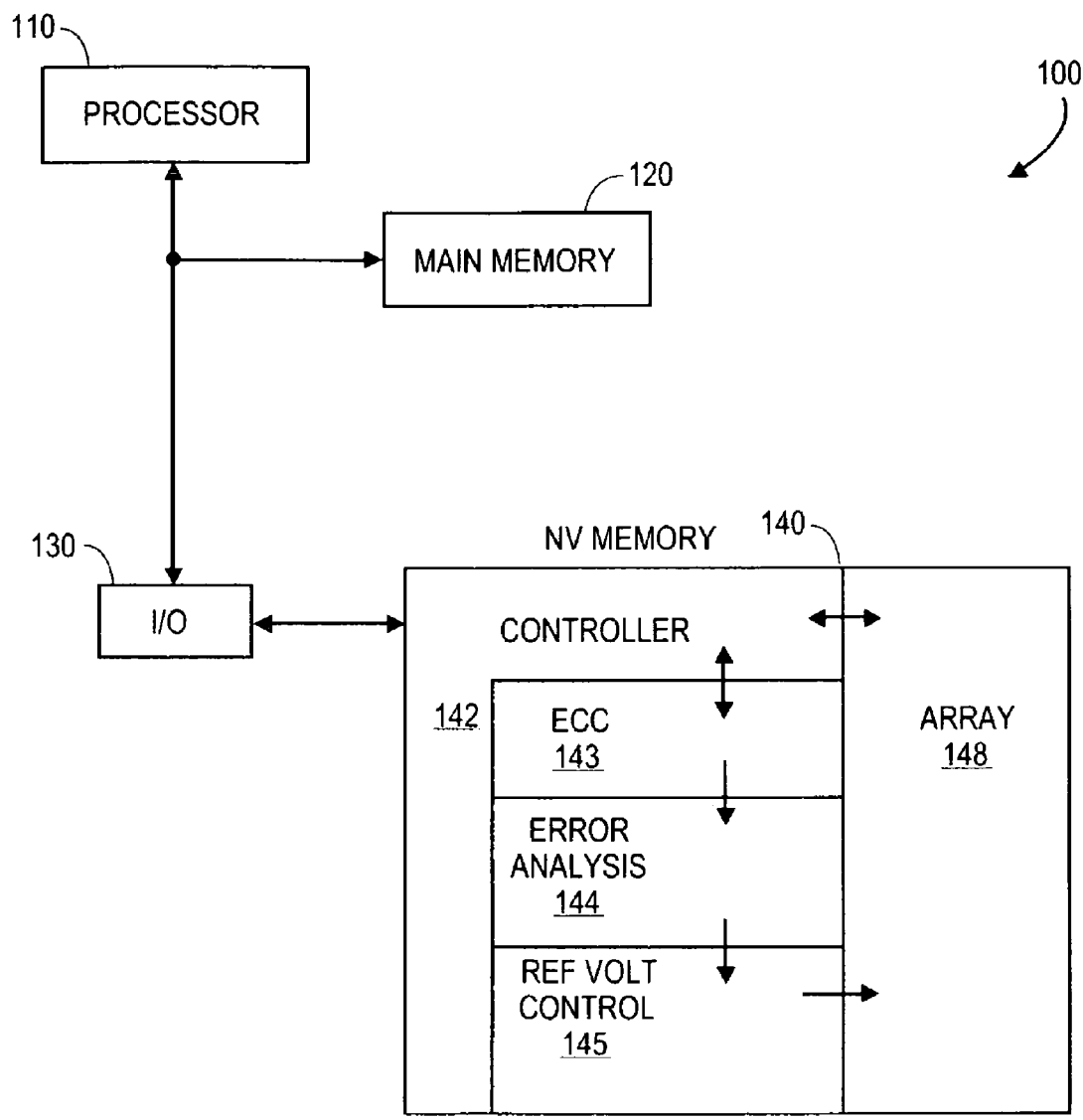
FIG. 1 shows a system containing a non-volatile memory, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing, transmitting, and/or receiving information in a form readable by one or more computers. For example, a computer-readable medium may include a tangible storage medium, such as but not limited to read only memory (ROM); random access memory (RAM); magnetic disk storage media: optical storage media; a flash memory device, etc. A computer-readable medium may also include a propagated signal which has been modulated to encode the instructions, such as but not limited to electromagnetic, optical, or acoustical carrier wave signals.

In various embodiments, the reference voltage used for read operations in a non-volatile memory may be adjusted up or down, based on the type of errors detected over a range of addresses (e.g., a page, but other ranges may be used). In this scheme, the number of errors in one direction may be compared to the number of errors in the other direction (for example, the number of 0-to-1 errors may be compared to the number of 1-to-0 errors). If there are no more errors in one direction than the other, then the causes of these errors are assumed to be random and no adjustment to the reference voltage is made to correct it. But if the accumulated total indicates more errors in one direction than the other (beyond a given threshold), the reference voltage may be adjusted in an attempt to make that difference closer to zero for subsequent reads. For multiple-bits-per-cell memories, where there are multiple reference voltages for each cell, each reference voltage may be adjusted separately by keeping track of the errors related to that particular reference voltage.

FIG. 1 shows a system containing a non-volatile memory, according to an embodiment of the invention. The illustrated system 100 comprises a processor 110, a main memory 120, input-output logic 130, and a non-volatile (NV) memory 140. In this particular implementation, the NV memory is attached as an I/O device (such as but not limited to a solid-state disk), but other embodiments may place the NV memory elsewhere in the system (such as but not limited to a part of the main memory itself, a cache memory working in cooperation with the main memory, etc.). Various embodiments of the invention should be usable in diverse applications, and in different parts of a system, whether or not those applications and parts are specifically described here.

The NV memory may employ any feasible type of NV storage technology that uses an adjustable reference voltage for read operations. It may be particularly useful in NV memory that reads an entire range of sequential memory locations with a single read command (such as but not limited to reading a page of memory in a NAND flash memory), rather than reading an individual byte or word with a single read command.

In the illustrated embodiment of FIG. 1, NV memory 140 may comprise a storage array 148 and a controller 142 to control operations with the array such as read, write, erase, and adjustment of reference voltages. The controller 142 may be further separated into other functional units, such as error checking and correction (ECC) unit 143, error analysis unit 144, and reference voltage control unit 145. Although these units are shown as separate functional units, two or more of them may share common physical circuitry and/or code.

Whenever the controller 142 receives a read request from the processor 110 or other device, the controller may initiate an operation that reads data from multiple sequential storage locations in the array. The starting address of the locations may be indicated by the read request, while the number of locations may be specified in the request or may be predefined in some other manner. As the data is read and placed in a buffer, the ECC unit may detect any errors in the data, correct those errors that it is able to correct through its error-correction algorithm, and keep track of the errors. After reading the desired quantity of data (such as a page of data, though other sizes may be used), the correctable errors may be analyzed to determine how many 0-to-1 errors occurred and how many 1-to-0 errors occurred. If the number of errors in one direction exceeds the number of errors in the other direction by a predefined amount, the reference voltage that was used for the read operation may be adjusted by the Reference Voltage Control unit in an attempt to correct the cause of these errors. Future read requests may repeat this entire process, so the reference voltage may be adjusted again as circumstances indicate.

Figure 2A:
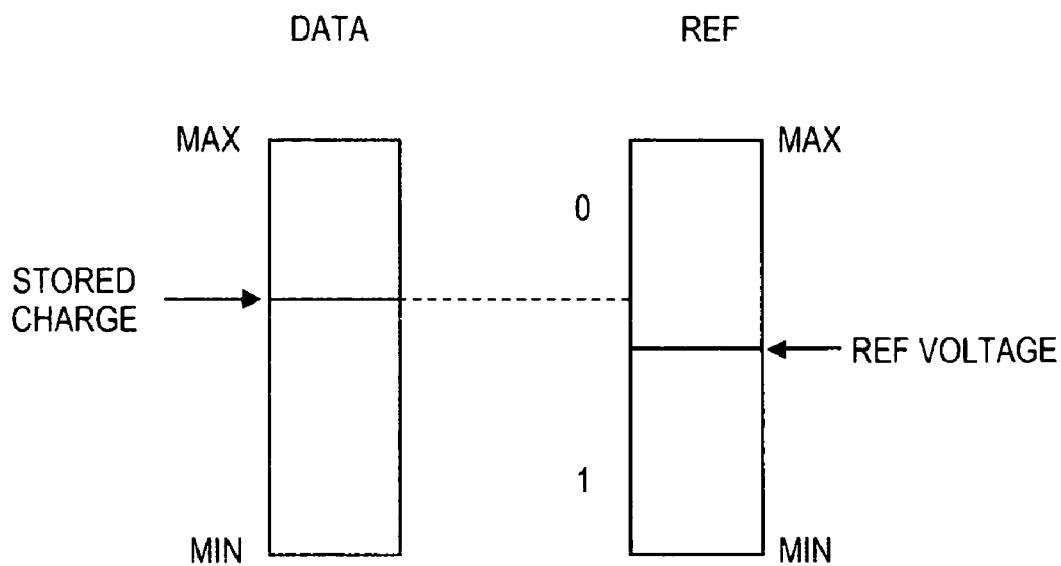
FIGS. 2A and 2B show bar charts indicating the charge in a single data cell compared to the reference voltage, according to an embodiment of the invention.
Figure 2B:
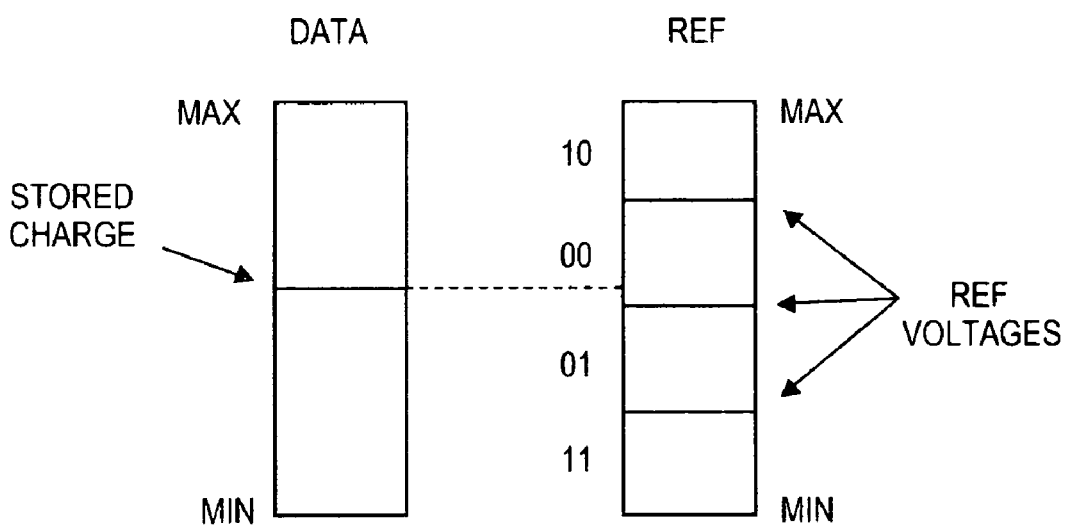

FIGS. 2A and 2B show bar charts indicating the charge in a single data cell compared to the reference voltage, according to an embodiment of the invention. FIG. 2A shows a single-bit-per-cell (SBC) configuration, in which a single binary bit is stored in each data cell. The reference voltage may be set at the factory to a value somewhere between the minimum and maximum values shown, but may later be adjusted by the memory controller during operation. Although the value of the reference voltage (either the pre-set factory value or the adjusted value) should remain relatively stable, it may gradually leak charge over a period of time and therefore decrease in value.

When writing data to the data cell (or when erasing the data cell), the stored charge in the data cell may be set to various values between the minimum and maximum values, and that value should also remain relatively stable until the data is erased or rewritten, although it may also leak charge over a long period of time. During a read operation, a voltage comparator may be used to compare the voltage of the stored charge in the data cell with the reference voltage. If the voltage in the data cell is greater than the reference voltage, the cell may be considered to contain a binary '0'. Alternatively, if the voltage in the data cell is less than the reference voltage, the cell may be considered to contain a binary '1'. (Note: in some embodiments, this assignment of binary value to voltage range may be reversed, so that a voltage higher than the reference voltage would represent a '1', and lower than the reference voltage would represent a '0'. Assigning different voltage ranges to different binary values in this manner is well known in the art.)

As long as the voltage in the data cell and the reference voltage are not too close to each other in value, the voltage comparator should be able to make a non-ambiguous reading from the cell. However, charge leakage or other phenomena can cause the data voltage and the reference voltages to get too close to each other, or may even cause one voltage to end up on the wrong side of the other voltage, resulting in an error. As previously stated, some errors may be corrected by implementing an ECC algorithm on the data read from multiple cells, provided the errors are not too numerous. Those errors that are not correctable by the ECC algorithm are labeled as uncorrectable errors in this document, even if the correct data may be obtained subsequently in other ways.

FIG. 2B shows a multiple-bits-per-cell (MBC) configuration, in which a single data cell may be used to store multiple binary bits. In this particular example, three reference voltages are used to divide the potential voltage range into four parts, with each part representing a different two-bit combination. In one embodiment, the three reference voltages would be stored separately, so that each could be adjusted without affecting the other two. If the voltage of the stored charge in the data cell falls within one of the four indicated parts, it represents the two-bit binary value associated with that part. The particular two bit combination shown uses a Gray code combination, so that only one binary bit changes when transitioning across any reference voltage. However, any other assignment of two-bit codes to each range is also possible. Although a 4-part, 3-reference voltage example is shown, other embodiments may store more bits in each data cell by using more reference voltages (e.g., 8-parts with 7-reference voltages to store three bits per cell).

The MBC technique of FIG. 2B differs from the SBC technique of FIG. 2A in at least two ways: 1) each multi-bit combination falls within a smaller range of voltages, so that it is easier for the stored charges to drift into an error condition, and 2) errors cannot be characterized simply as a 0-to-1 transition or a 1-to-0 transition, since the associated bit patterns are more complicated than that. Therefore, such transitions will subsequently be described as an 'increased value error' or a 'decreased value error', and these terms will be applied to both SBC and MBC memory types. An 'increased value error' indicates that the voltage level in the data cell was higher than the associated reference voltage when it should have been lower than that reference voltage, a problem that may be corrected by increasing the reference voltage. Similarly, a 'decreased value error' indicates that that the voltage level in the data cell was lower than the associated reference voltage when it should have been higher than that reference voltage, a problem that may be corrected by decreasing the reference voltage. For instance, in the example of FIG. 2B, reading a '00' when the correct data was a '01', would be described as an increased value error, because 00 is represented by a higher voltage level than 01 in this configuration. This problem may be corrected by increasing the reference voltage that divides the '00' and '01' ranges.

FIG. 3 shows the errors obtained from reading a page of data, according to an embodiment of the invention. The illustrated page contains eight sectors, labeled S0-S7. In one embodiment, each sector may contain 512 bytes and the page would contain 4096 bytes, but other embodiments may use other quantities for the number of bytes per sector, sectors per page, and bytes per page. In the illustrated example, after reading the page, the ECC unit found that eleven bits were read incorrectly, with eight of the errors being decreasing value errors (indicated with a down arrow) and three of them being increasing value errors (indicated with an up arrow), for a net result five decreasing value errors. If this finding is deemed sufficient to warrant adjusting the reference voltage, the reference voltage may then be set to a lower value, so that a future reading of the page might produce a net result closer to zero errors.

Various approaches may be taken when deciding whether to adjust the reference voltage. For example, the number of errors in one direction may need to exceed the number of errors in the other direction by a defined amount before the reference voltage will be adjusted. This defined amount may be based on various criteria, such as but not limited to: 1) an absolute number (e.g., at least 3 more errors in one direction than the other), 2) a percentage (e.g., the number of errors in one direction must exceed the number of errors in the other direction by at least 25%), 3) a minimum number of errors must be found (e.g., at least ten errors in a page), 4) other criteria, and/or 5) any combination of two or more of these.

Once the decision to adjust the reference voltage has been made, the amount of adjustment may be based on various factors. In some embodiments, the amount the reference voltage is adjusted may depend on the indicated size of the problem (e.g., if the difference in the number of errors is large, the adjustment will be large). In other embodiments, each adjustment may be in a fixed and relatively small increment, and larger errors may have to be corrected incrementally over time with multiple read operations and their associated incremental corrections to the reference voltage. Other embodiments may adjust the reference voltage by selecting one of a limited number of predefined correction amounts. In some embodiments, the amount of correction in one direction may be determined differently than the amount of correction in the other direction.

The size of the array that uses a single reference voltage may be different in different embodiments. For example a single reference voltage (or a single set of reference voltages for MBC) may be used for an entire die containing the memory array. Alternately, multiple reference voltages (or multiple sets of reference voltages for MBC) may be contained on a single die, with each serving a different part of the array. As a general rule, the larger the array served by a single reference voltage, the more likely it is that different parts of the array will make different adjustments to the reference voltage, with some parts reversing the corrections made by other parts. This may be part of the tradeoff that should be made when determining how many sets of reference voltages to design into each die, as well as deciding what criteria to use in deciding when, and how much, to adjust the reference voltages.

Figure 4:
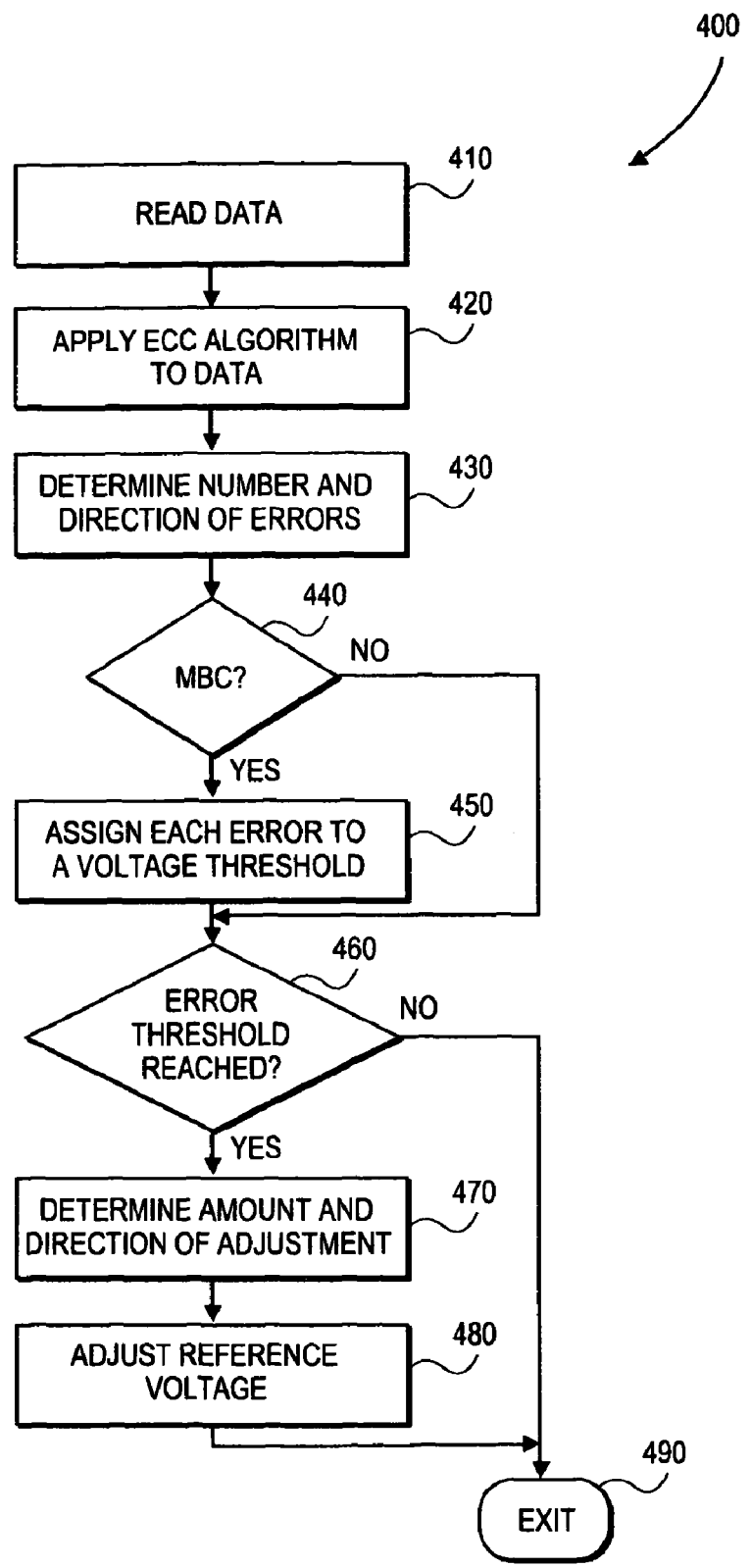
FIG. 4 shows a flow diagram of a method of adjusting a reference voltage for a non-volatile memory, according to an embodiment of the invention.

FIG. 4 shows a flow diagram of a method of adjusting a reference voltage for a non-volatile memory, according to an embodiment of the invention. In flow diagram 400, data may be read from the NV memory at 410. In some embodiments, a full page of data may be read, but other embodiments may read larger or smaller amounts of data. At 420, an ECC algorithm may be applied to the data to detect errors in the data as read, and to correct those errors where feasible. Depending on the type of errors detected and the nature of the ECC algorithm, some of the errors may not be correctable. The following operations only apply to the correctable errors.

At 430 the number of correctable errors, and the direction of each of those correctable errors (i.e., whether it was an increasing value error or a decreasing value error), is determined. If the NV memory uses MBC technology, as determined at 440, then each of the errors may be assigned at 450 to a specific one of the multiple reference voltages used for reading MBC cells. The assignment may be based on which of the reference voltages was involved in that particular error. Although this assignment at 450 is shown separately from the determination of the errors at 430, in some embodiments the errors may be assigned on the fly while the errors are being determined. In either case, after the errors are identified and assigned, operations 460-480 may then be applied to the reference voltage to make any corrections to that reference voltage that are deemed necessary. Operations 460-480 are shown only once in FIG. 4, and need be performed only once in an SBC memory, but it is understood that these operations may be performed separately for each reference voltage in an MBC memory.

At 460, it may be determined whether the quantity and direction of the errors identified for this reference voltage are sufficient (as indicated by the term 'error threshold') to justify adjusting this reference voltage. As previously described, the algorithm for making this decision may be based on various factors. If a voltage adjustment is not justified, the process may exit at 490. But if a voltage adjustment is justified, the amount and direction of that adjustment is determined at 470. This adjustment may then be made to the reference voltage at 480 before exiting at 490. Physical mechanisms for making such adjustments to reference voltages are known, and are therefore not described here.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus, comprising:
a non-volatile memory array;
a memory controller coupled to the memory array, wherein the memory controller is to perform operations with the memory array comprising:
reading data from multiple sequential storage locations in the memory array;
performing an error checking and correction algorithm on the data to identify multiple correctable errors;
separating the errors into a first quantity of 0-to-1 errors and a second quantity of 1-to-0 errors;
comparing the first quantity with the second quantity to determine a difference between the first quantity and the second quantity that exceeds a threshold;
determining an amount and direction of a correction to a reference voltage, based on the difference, the amount and the direction of the correction being determined so as to permit the difference to become closer to zero for a subsequent reading of the locations; and
performing the correction to the reference voltage.

2. The apparatus of claim 1, wherein the non-volatile memory array is a NAND flash memory array.

3. The apparatus of claim 1, wherein the multiple sequential storage locations represent a page in the non-volatile memory.

4. The apparatus of claim 1, wherein said comparing comprises at least one of:
1) determining a numerical difference between the first quantity and the second quantity;
2) determining a percentage difference between the first quantity and the second quantity; and
3) determining a total number of errors in the first quantity and the second quantity.

5. The apparatus of claim 1, wherein said performing the correction comprises changing the reference voltage by a predetermined amount.

6. The apparatus of claim 1, wherein said performing the correction comprises changing the reference voltage by a variable amount dependent on the result.

7. The apparatus of claim 1, wherein said performing the correction comprises changing the reference voltage by an amount selected from among multiple predetermined amounts.

8. The apparatus of claim 1, further comprising a processor coupled to the memory controller.

9. The apparatus of claim 1, wherein:
the non-volatile memory array is a multiple-bits-per-cell memory array; and
the operations of separating, comparing, determining, and performing the correction are performed for each of multiple reference voltages.

10. A method, comprising:
reading data from multiple sequential storage locations in a non-volatile memory;
performing an error checking and correction algorithm on the data to identify multiple correctable errors;
separating the errors into a first quantity of 0-to-1 errors and a second quantity of 1-to-0 errors;
comparing the first quantity with the second quantity to determine a difference between the first quantity and the second quantity that exceeds a threshold;
determining an amount and direction of a correction to a reference voltage, based on the difference, the amount and the direction of the correction being determined so as to permit the difference to become closer to zero for a subsequent reading of the locations; and
performing the correction to the reference voltage.

11. The method of claim 10, wherein the multiple sequential storage locations represent a page in the non-volatile memory.

12. The method of claim 10, wherein said comparing comprises at least one of:
1) determining a numerical difference between the first quantity and the second quantity;
2) determining a percentage difference between the first quantity and the second quantity; and
3) determining a total number of errors in the first quantity and the second quantity.

13. The method of claim 10, wherein said performing the correction comprises changing the reference voltage by a predetermined amount.

14. The method of claim 10, wherein said performing the correction comprises changing the reference voltage by a variable amount dependent on the result.

15. The method of claim 10, wherein said performing the correction comprises changing the reference voltage by an amount selected from among multiple predetermined amounts.

16. An article comprising a tangible computer-readable medium that contains instructions, which when executed by one or more processors result in performing operations comprising:
reading data from multiple sequential storage locations in a non-volatile memory;
performing an error checking and correction algorithm on the data to identify multiple correctable errors;
separating the errors into a first quantity of 0-to-1 errors and a second quantity of 1-to-0 errors;
comparing the first quantity with the second quantity to determine a difference between the first quantity and the second quantity that exceeds a threshold;
determining an amount and direction of a correction to a reference voltage, based on the difference, the amount and the direction of the correction being determined so as to permit the difference to become closer to zero for a subsequent reading of the locations; and
performing the correction to the reference voltage.

17. The article of claim 16, wherein the multiple sequential storage locations represent a page in the non-volatile memory.

18. The article of claim 16, wherein said comparing comprises at least one of:
1) determining a numerical difference between the first quantity and the second quantity;
2) determining a percentage difference between the first quantity and the second quantity; and
3) determining a total number of errors in the first quantity and the second quantity.

19. The article of claim 16, wherein said performing the correction comprises changing the reference voltage by a predetermined amount.

20. The article of claim 16, wherein said performing the correction comprises changing the reference voltage by an amount dependent on the result.

21. The article of claim 16, wherein said performing the correction comprises changing the reference voltage by an amount selected from among multiple predetermined amounts.

* * * * *